United States Patent
Bengtsson et al.

(10) Patent No.: US 11,391,259 B2
(45) Date of Patent: Jul. 19, 2022

(54) CRANKSHAFT DRIVEN FLYWHEEL MAGNETO GENERATOR WITH CIRCULAR WINDING FOR POWER SUPPLY IN HANDHELD BATTERYLESS COMBUSTION ENGINES

(71) Applicant: SEM AB, Åmål (SE)

(72) Inventors: Jörgen Bengtsson, Backen (SE); Bert Gustafsson, Åmål (SE); Lars Svensson, Åmål (SE)

(73) Assignee: SEB AB, Amal (SE)

( * ) Notice: Subject to any disclaimer, the term of this patent is extended or adjusted under 35 U.S.C. 154(b) by 0 days.

(21) Appl. No.: 17/274,691

(22) PCT Filed: Nov. 22, 2019

(86) PCT No.: PCT/EP2019/082234
§ 371 (c)(1),
(2) Date: Mar. 9, 2021

(87) PCT Pub. No.: WO2020/114802
PCT Pub. Date: Jun. 11, 2020

(65) Prior Publication Data
US 2022/0099062 A1    Mar. 31, 2022

(30) Foreign Application Priority Data
Dec. 4, 2018 (SE) .................... 1851503-1

(51) Int. Cl.
*F02P 1/02* (2006.01)
*H02K 21/22* (2006.01)
(Continued)

(52) U.S. Cl.
CPC ............. *F02P 1/02* (2013.01); *F02M 51/005* (2013.01); *F02P 1/04* (2013.01); *F02P 7/067* (2013.01);
(Continued)

(58) Field of Classification Search
CPC ... F02P 1/02; F02P 1/04; H02K 1/145; H02K 21/222; H02K 21/227
(Continued)

(56) References Cited

U.S. PATENT DOCUMENTS 3,623,467 A * 11/1971 Piteo ................... H02K 21/222
    123/149 R
3,961,618 A *  6/1976 Swift ....................... F02P 1/02
    123/406.57
(Continued)

FOREIGN PATENT DOCUMENTS

DE    102007037581 A1    2/2008
JP        S5656160 A       5/1981
SE          446650 B       9/1986

OTHER PUBLICATIONS

Search report for related PCT/EP2019/082234 dated Feb. 17, 2020.
Search report for related 1851503-1 dated Jun. 25, 2019.

*Primary Examiner* — Erick R Solis
(74) *Attorney, Agent, or Firm* — Schott P.C.

(57) ABSTRACT

A magneto ignition system for battery less hand-held combustion engines includes a claw generator with a stationary circular power coil winding enclosed by two iron claw halves and with a rotating flywheel magnet ring with multiple magnetic poles. The stationary circular coil winding includes a trigger coil with a stationary coil winding arranged in a plane orthogonal to the stationary circular power coil winding. The magneto ignition system further includes an engine control module ECM for establishment of appropriate ignition timing, and an ignition coil module ICM. The stationary circular power coil winding may provide the electrical power supply to both the ignition timing module ECM and the ignition coil module ICM.

11 Claims, 4 Drawing Sheets

(51) Int. Cl.
  *F02P 7/067*  (2006.01)
  *F02M 51/00*  (2006.01)
  *H02K 1/14*  (2006.01)
  *F02P 1/04*  (2006.01)

(52) U.S. Cl.
  CPC .......... *H02K 1/145* (2013.01); *H02K 21/222* (2013.01); *H02K 21/227* (2013.01)

(58) Field of Classification Search
  USPC ................ 123/406.56, 406.57, 406.58, 601; 310/257
  See application file for complete search history.

(56) References Cited

U.S. PATENT DOCUMENTS

| | | | | |
|---|---|---|---|---|
| 5,513,619 | A * | 5/1996 | Chen | F02P 1/02 123/600 |
| 7,859,124 | B2 * | 12/2010 | Maier | F02B 63/04 290/10 |
| 2008/0053407 | A1 | 3/2008 | Maier et al. | |
| 2009/0102314 | A1 * | 4/2009 | Miyata | H02K 1/243 310/257 |
| 2011/0140707 | A1 | 6/2011 | Böker et al. | |
| 2017/0167463 | A1 | 6/2017 | Ganter et al. | |
| 2017/0167500 | A1 | 6/2017 | Andreas et al. | |
| 2018/0238256 | A1 | 8/2018 | Noguchi | |

\* cited by examiner

CRANKSHAFT DRIVEN FLYWHEEL MAGNETO GENERATOR WITH CIRCULAR WINDING FOR POWER SUPPLY IN HANDHELD BATTERYLESS COMBUSTION ENGINES

BACKGROUND OF THE INVENTION

The invention relates to Magneto ignition system for battery less hand-held combustion engines.

PRIOR ART

Several flywheel magneto systems for handheld engines have been developed over the years, said flywheel or crankshaft driven magneto systems providing both the triggering pulse for the ignition start as well as power supply for the ignition and/or other electrically appliances such as an electric lamp (for night operations), electrically heated handles, or other electrical features of the hand held combustion engine driven tools.

Already in 1976 was U.S. Pat. No. 39,452,501 (Motorola) published which used a flywheel alternator that included separate trigger coil windings for each cylinder and an additional coil winding providing power to run other electrical appliances. A rotor with circumferentially arranged permanent magnets with opposite polarity induced a trigger pulse in a stationary coil only once each flywheel revolution, and electrical power output from a separate power winding. All these coil windings wound as a cylinder lying in the same plane as the rotor and with the cylinder axis oriented transversely of the rotor.

In 1991 was U.S. Pat. No. 5,072,714 (SEM AB) published, showing an alternative flywheel driven magneto system providing both the triggering pulse for the ignition start as well as the electrical energy for the ignition spark. A rotor with circumferentially arranged permanent magnets with opposite polarity induced a trigger pulse and electrical power output from a separate power winding. All these coil windings wound as a cylinder lying in the same plane as the rotor but with the cylinder axis oriented radially of the rotor. The cylindrical windings oriented in a star shape on legs directed radially.

In 1994 was U.S. Pat. No. 5,313,918 (SEM AB) published, showing yet an alternative flywheel driven magneto system. Also, in this system all the coil windings wound as a cylinder lying in the same plane as the rotor but with the cylinder axis oriented radially of the rotor. The cylindrical windings oriented in a star shape on legs directed radially.

In 2015 was U.S. Pat. No. 8,950,381 (Husquarna) published, showing yet an alternative flywheel driven magneto system. In this system the ignition system also provided power to the control module for the fuel supply.

The dominant design in flywheel magneto systems for handheld engines includes several cylindrical coil windings lying transversally to or radially in relation to the magnetic rotor. This may hinder effective cooling of the windings during use. More compact flywheel magneto systems are thus sought for that both occupies less space around the flywheel and/or the crankshaft for improved cooling thereof, but also adds less weight to the hand-held engines.

Producing a flywheel magneto system using cylindrical windings oriented in a star shape on legs directed radially, involves more time and hence increase costs for winding all windings on each individual leg. Producing multiple windings on star shaped legs involve an initial winding on one leg and thereafter indexation to next leg for further winding and so on, and all these transitions of a winding from one leg to another introduce a potential weak spot in the winding that is exposed for breakage.

SUMMARY OF THE INVENTION

The present invention relates to a solution of the problems mentioned above. The invention is based on a usage of a claw generator with a stationary circular power coil enclosed by two iron claw halves forming a cage enclosing the circular power coil. This simple claw generator could produce enough power for the ignition system including the electronic control module as well as the power supply to the ignition coil as well as producing enough power also for the additional electronic fuel control system.

The power producing coil is simply wound on a cylindrical bobbin forming one single one-phase winding that may be produced rapidly and without any indexation of the bobbin during winding. The stationary circular power coil could be wound on the bobbin and assembled into the generator structure by clamping the two claws together. No iron core with legs needs to be present during winding which further simplifies the winding process, avoiding any transitions from one leg to another leg during winding and thus eliminating weak points in the windings from one leg to another.

The synchronization pulse could also be obtained from the claw generator by adding a low impedance pick-up coil arranged over claws of the claw generator by using asymmetric magnetic field induction.

The inventive magneto ignition system for battery less hand-held combustion engines comprises;

a claw generator arranged with a stationary circular power coil winding enclosed by two ferro magnetic claw halves with a plurality of legs in each claw half and with claws in each claw half facing and arranged overlapping each other, and with a rotating flywheel magneto driven by the crankshaft of the combustion engine around said stationary circular power coil winding, with a plurality of magnet poles arranged in said rotating flywheel magneto with alternating polarity. A trigger coil with a stationary coil winding is arranged in said claw generator around at least one claw in each claw half with a low impedance coil winding of the trigger coil and the coil winding of the trigger coil lying in a plane orthogonal to the stationary circular power coil winding. The inventive magneto ignition system further comprises an engine control module arranged at a distance from said claw generator, said engine control module containing a processor and associated memory for establishment of appropriate ignition timing dependent on trigger coil signal and mapped ignition timing in said memory. The inventive magneto ignition system further comprises an ignition coil module electrically connectible to an ignition plug of the combustion engine. The ignition coil module may preferably be of the coil-on plug type. The inventive magneto ignition system for battery less hand-held combustion engines obtains the power supply via an electric supply system with a current conductor attached in at least one feeding end at the stationary circular power coil winding, said current conductor connected to and supplying energy to the ignition timing module and the ignition coil module. It should be noted that the stationary circular power coil winding in some cases may be wound as two or more coil windings.

This set-up of the inventive magneto ignition system for battery less hand-held combustion engines obtains all necessary power from the stationary circular power coil winding for driving both the ignition power supply as well as the ignition timing module. The single stationary circular power coil winding requires less space and is much easier to produce with less weak points in the coil windings.

This kind of basic set-up may be implemented in battery less hand-held combustion engines with conventional carburetor for fuel supply, i.e. low-end control systems for combustion engines.

In a preferred embodiment of the inventive magneto ignition system may also a vibration sensitive knock sensor be arranged permanently to a claw of the stationary circular power coil winding. The location of the knock sensor on the claw of the stationary circular power coil winding provides for a shielded position as well as a good location for detecting a knocking condition during combustion, as such knocking condition generates a high frequency pinging that is captured by the engine casing. This kind of second level set-up may be implemented in battery less hand-held combustion engines with conventional carburetor for fuel supply, i.e. improved low end control systems for combustion engines, having also knock control system.

In a further preferred embodiment of the inventive magneto ignition system may also the magneto ignition system further comprise a signal transmission architecture with a first vibration signal wire transmitting a vibration signal from the vibration sensitive knock sensor to the engine control module.

In yet a preferred embodiment of the inventive magneto ignition system may also an ionization detection module be electrically connected to the ignition coil, detecting the ionization current through the spark plug gap via the ignition coil. This kind of third level set-up may be implemented in battery less hand-held combustion engines with conventional carburetor for fuel supply, i.e. medium end control systems for combustion engines, having also knock control system using both knock sensors of the piezo electric type as well as knock sensors detecting ionization current frequencies typical for a knocking condition. Using two types of knocking sensing sensors, i.e. both piezo electric as well as ion sense sensors, may be used for selective ignition timing control as ion sense sensor may be better to detect knocking at high revs and in some engine load cases may ignition timing control be cancelled if not both sensors indicate a knocking condition. However, ion sense could be used also for detecting a multitude of other engine combustion parameters, such as A/F detection; Pressure peak position and other engine combustion parameters that may affect ignition timing.

In yet a preferred embodiment of the inventive magneto ignition system may also the system comprise a signal transmission architecture with a second ionization signal wire transmitting a signal representative for the ionization current from the ionization detection module to the engine control module. The ionization detection module is preferably integrated in the ignition coil module.

In a preferred embodiment of the inventive magneto ignition system is also a fueling system connected to the engine control module via a control conductor wire and said fueling system connected to the current conductor for supplying electrical energy to the fueling system from the claw generator.

This kind of fourth level set-up may be implemented in battery less hand-held combustion engines with electrical injectors for fuel supply, i.e. high-end control systems for combustion engines. The claw generator may thus supply the electrical power supply to the engine control module, the ignition coil as well as the electrical fuel injectors and use the trigger coil signal from the claw generator for determining the rotational position for starting and ending the ignition and fuel timing. This high end control system may preferably be used in single-cylinder but also multi-cylinder engines, including at least one electrically controlled fuel injector in the fueling system.

LIST OF DRAWINGS

In the following schematic drawings are details numbered alike in figures, and details identified and numbered in one figure may not be numbered in other figures in order to simplify figures.

FIG. 1; shows the inventive claw generator mounted in an engine casing of a hand-held engine.

FIG. 2; shows a cross section view of the claw generator along A-A in FIG. 1;

FIG. 3; shows the same a cross section view along A-A in FIG. 1 but with a crankshaft mounted in the center of the claw generator;

FIG. 4; shows a cross section view of the claw generator along B-B in FIG. 1;

FIG. 5a; shows one embodiment of the magnetic poles in the rotating flywheel magnet ring;

DETAILED DESCRIPTION OF THE INVENTION

Figure 1:
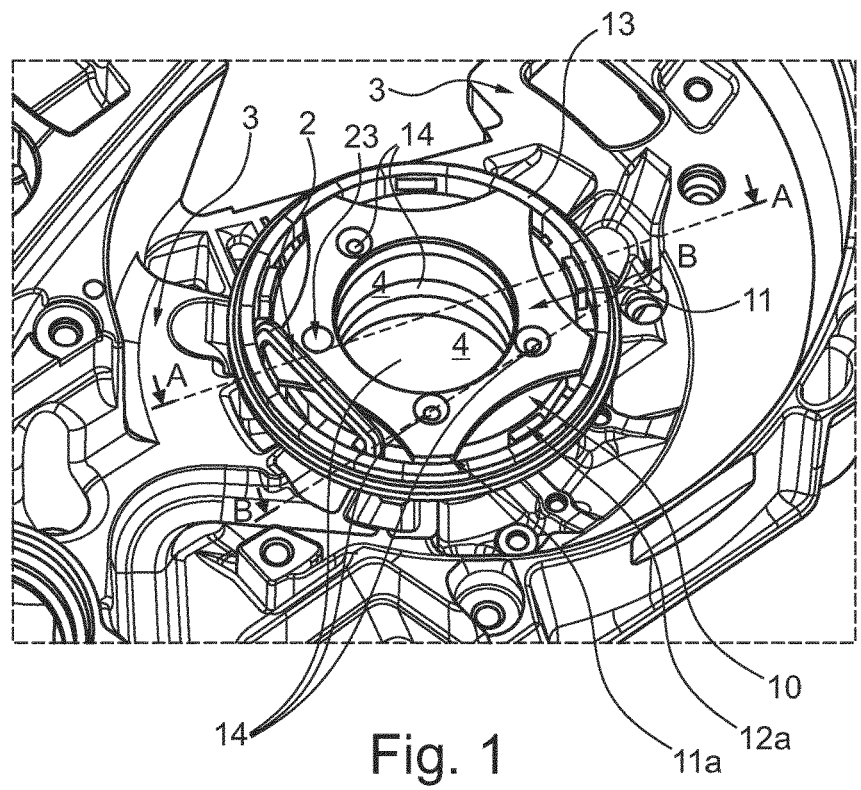

In FIG. 1 is the inventive claw generator 1 mounted in an engine casing 3 of a hand-held engine around a bearing seat 4 for a crankshaft. The engine casing 3 is conventionally casted in aluminum or any other light weight alloy. The claw generator consists of two basic part. The first basic part is a stationary part with a stationary circular power coil winding 10 clamped between an upper claw half 11 (as seen in FIG. 1) and lower claw half 12. The two claw halves 11,12 are firmly attached to the engine casing 3 with screws (not shown per se) applied through several mounting holes 14 ending with threaded screw holes 14a in the engine casing 3. Each claw half consists of a flat pentahedron shaped disc with a leg on each point end of the pentahedron shaped disc, wherein each leg is bent orthogonally to the orientation of the disc.

The upper and lower claw halves are mounted together such that the legs of one claw half lies between legs of the opposite claw half, i.e. such that the legs in each claw half are displaced 36°. All legs are preferably located uniformly around the circumference of the claw generator, and in one claw half are the 5 legs located 72° degrees apart, with the legs of the other claw half located in-between, i.e. 36° degrees apart.

The claw halves are in direct metallic contact with the engine casing and a knock sensor 23, a vibration sensor typically of the piezo electric type, is firmly attached to one claw half. As the engine casing is a good sound conductor for the pinging noise that occurs during a knocking combustion, could the knock sensor detect the high frequency pinging noise from a knocking combustion and the engine control module may then alter ignition timing in order to mitigate the knocking condition.

Further, the first stationary part also includes a trigger coil winding 2, which trigger winding 2 is lying in a plane orthogonal to the plane of the stationary circular power coil winding 10. The trigger winding is wound on a circular bobbin 2a and the bobbin and winding is mounted over two legs of the claw halves as shown in FIG. 1. Around the stationary first basic part is the second basic part arranged, which is a rotating flywheel magnet ring 13 with magnet poles. The inner diameter of the rotating flywheel magnet ring 13 is slightly larger than the outer diameter of the legs 11a,12a, leaving a gap of about 1 mm or less in-between the stationary and rotating part. This rotating flywheel magnet ring 13 is driven by the crankshaft of the handheld engine.

Figure 2:
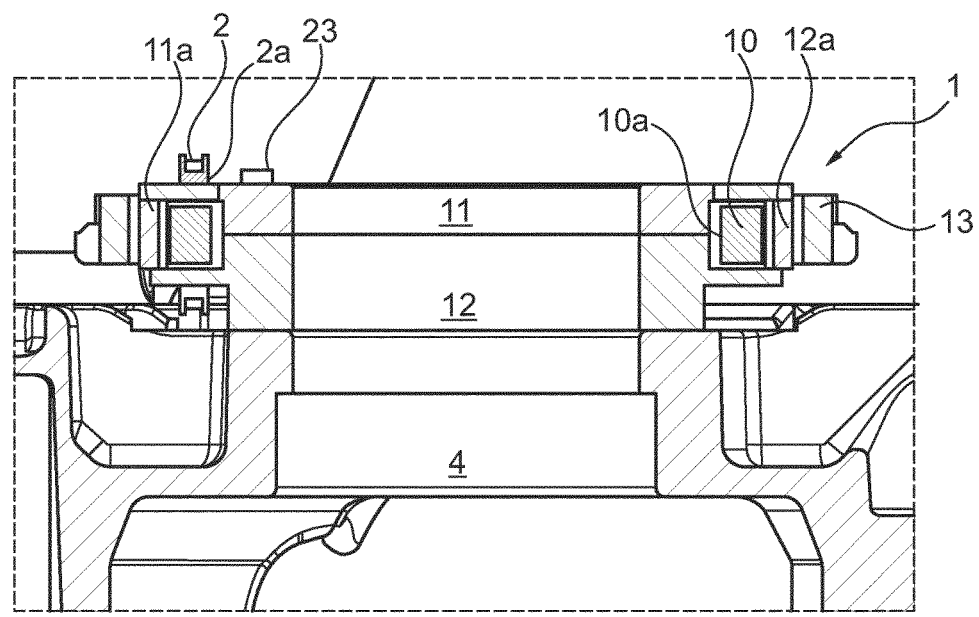

FIG. 2 shows a cross section view of the claw generator 1 along A-A in FIG. 1. The upper claw half 11 with the downwardly leg 11a is mounted to the lower claw half 12 with the upwardly directed leg 12a, with the stationary circular power coil winding 10 located radially inside of the legs 11a and 12a. The trigger coil winding 10 and its bobbin 2a is located around 2 legs of the claw halves, i.e. one leg from each claw half.

Figure 3:
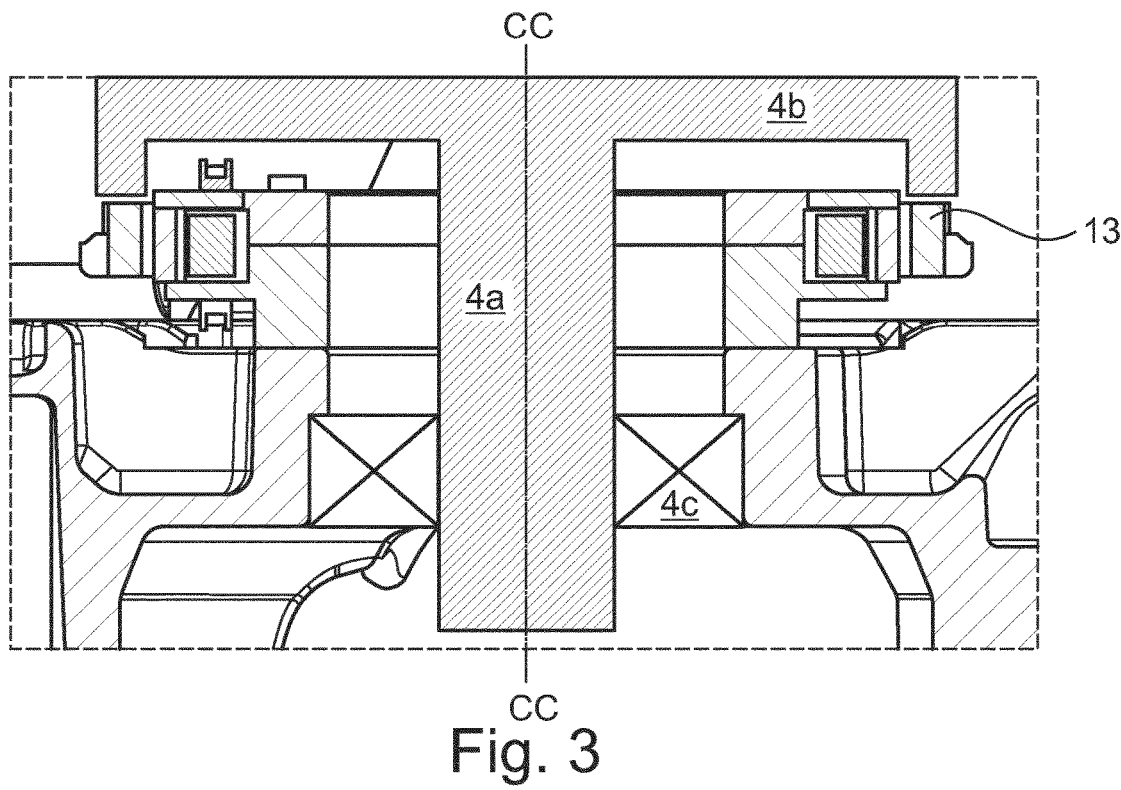

FIG. 3 shows the same cross section view as in FIG. 2, but with a crankshaft 4a mounted in the bearing seat 4, supported by a crankshaft bearing 4c, said crankshaft having a flywheel magnet ring carrier 4b firmly connected to the rotating flywheel magnet ring 13.

Figure 4:
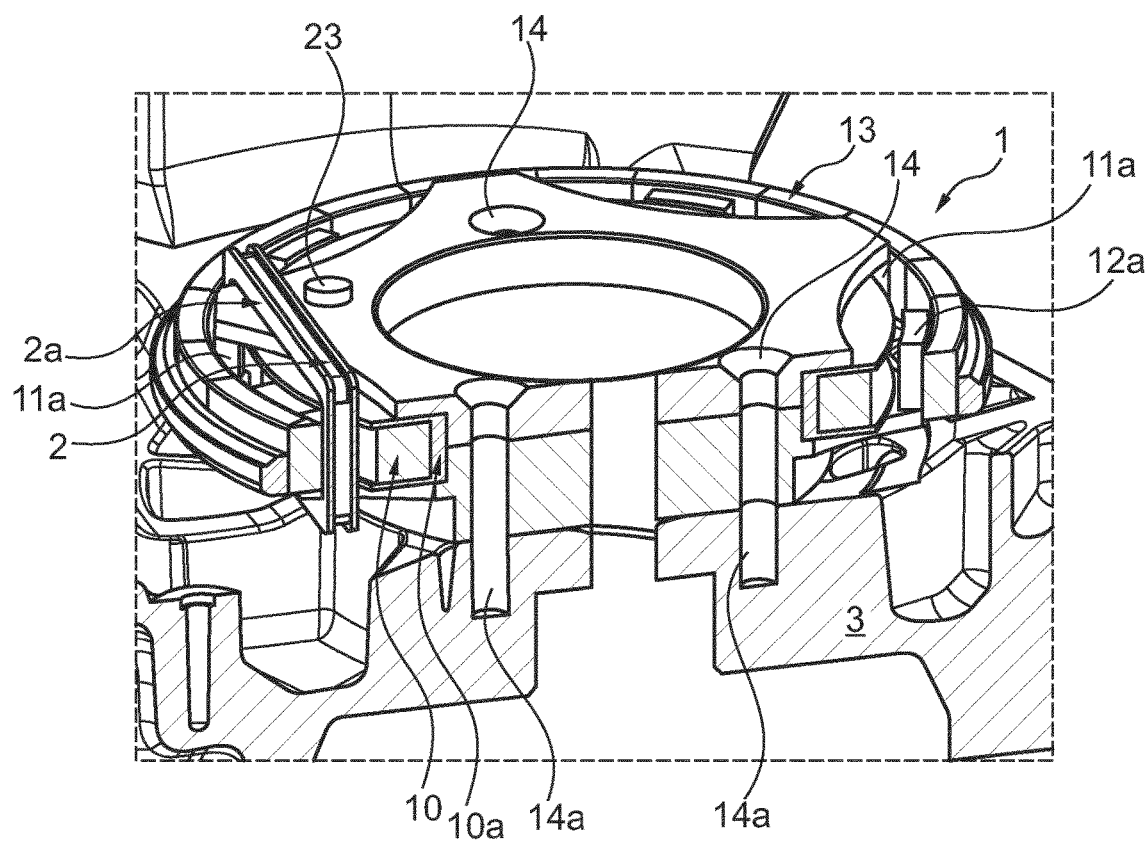

FIG. 4 shows a cross section view of the claw generator along B-B in FIG. 1, but seen in a slight inclined view from above. Here are two of the three mounting holes 14 disclosed that penetrates both claw halves, in register with threaded screw holes 14a in the engine casing 3.

Figure 5A:
FIG. 5b shows one possible configuration of asymmetric poles for establishment of a rotational reference position.

FIG. 5a show one principle design of the rotating flywheel magnet ring. In this embodiment are 20 magnet poles arranged around the rotating flywheel magnet ring, all with same size and radial extension over the circumference of the rotating flywheel magnet ring resulting in maximal pole arc width. This kind of rotating flywheel magnet ring may be used if no reference signal, as to a specific rotational position, is to be obtained from the generator as such. The embodiment shown in FIG. 5a may also be combined with a hall sensor or similar that register a reference position once per revolution.

If a specific rotational position is to be obtained may one pole have a shorter or longer pole arc width than all the others.

Figure 5B:
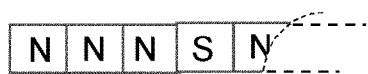

FIG. 5b shows a modification of the principle design of FIG. 5a with a first section of the rotating flywheel magnet ring having an unsymmetrical arrangement of the magnetic poles that cause a change in the magnetic flux once per revolution. In this embodiment are the first three poles of the same polarity. Alternatively, the second pole may be a non-magnetic pole.

The poles of the rotating flywheel magnet ring may have varying design.

A first option is to arrange all poles with a short gap between each pole segment resulting in a reduced pole arc width.

Figure 6:
FIG. 6 shows a possible alternative embodiment of the magnetic poles in the rotating cag.

Another option is shown in FIG. 6 where the poles are shaped with a trapezoidal form. This option with trapezoidal form of the poles has shown to be advantageous in claw-pole machines where the output torque from the claw-pole machine was about 1,5 times higher than using poles with varying pole arc width. In a generator application may the voltage output be stabilized on a higher level with trapezoidal form of the poles.

System Architecture

The magneto ignition system with a claw generator providing the electrical power supply to the engine control module ECM as well as the ignition control may in the low-end system be divided into 3 physical modules, i.e.

The claw generator with the optional knock sensor of the piezo-electric type;

The engine control module ECM; and

The ignition coil with the optional ionization detection module IDM.

The IDM is conventionally located in the low voltage connection to the secondary winding of the ignition coil.

The high-end system, with fuel injector control instead of a conventional carburetor may be divided into 4 physical modules, based upon the 3 physical modules of the low-end system i.e.

The claw generator with the optional knock sensor of the piezo-electric type;

The engine control module ECM;

The ignition coil with the optional ionization detection module IDM: and

The fueling system.

Figure 7:
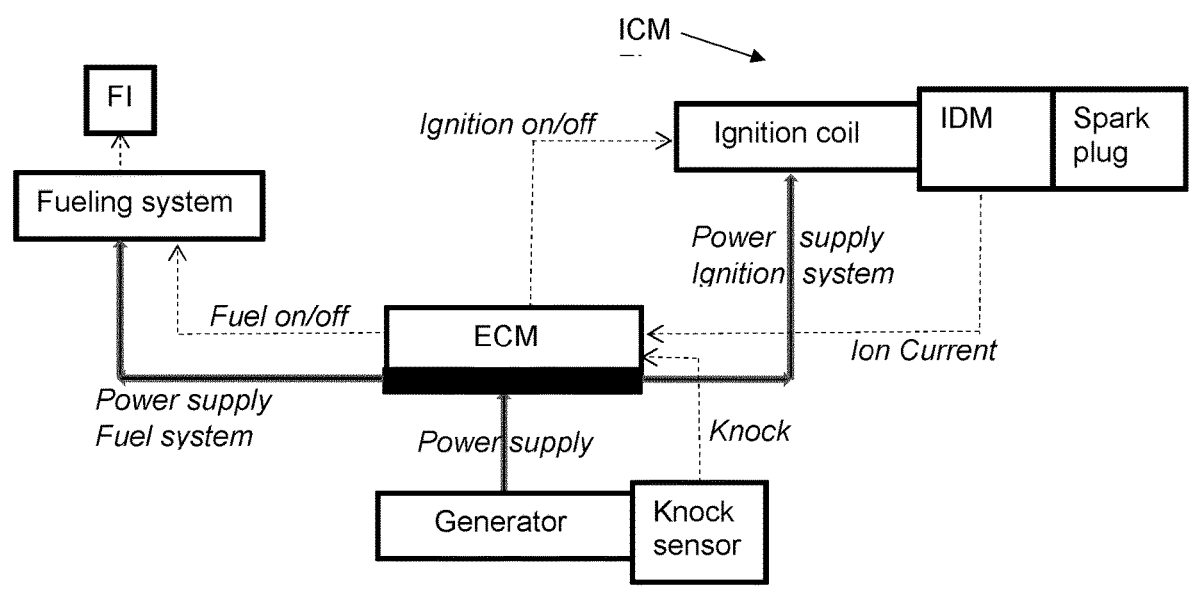
FIG. 7 shows the configuration of the inventive modularization of the ignition system with the signal transmission and power supply architecture.

The power supply to the modules may be implemented as shown in FIG. 7, with the power supply from the generator directly to a power supply board in the engine control module ECM. Further power supply to the ignition coil and the fueling system may be done from the power supply board in the engine control module.

The signal transmission architecture includes a first vibration signal wire, Knock Signal, transmitting a vibration signal from the vibration sensitive knock sensor (23 in FIGS. 1-4)) to the engine control module ECM, but also a second ionization signal wire, Ion Current, transmitting a signal representative for the ionization current from the ionization detection module IDM to the engine control module ECM. The signal transmission architecture also includes a control conductor wire, Fuel on/off, between the engine control module and the fueling system, but also a control conductor wire, Ignition on/off, between the engine control module and ignition control module ICM.

The invention claimed is:

1. A magneto ignition system for a batteryless hand-held combustion engine comprising;

a claw generator arranged with a stationary circular power coil winding enclosed by two ferro magnetic claw halves with a plurality of legs in each claw half and with claws in each claw half facing and arranged overlapping each other, and with a rotating flywheel magnet ring driven by a crankshaft of the batteryless hand-held combustion engine around said stationary circular power coil winding (10), with a plurality of magnet poles arranged in said rotating flywheel magnet ring with alternating polarity;

a trigger coil with a stationary coil winding arranged in said claw generator around at least one claw in each claw half with a low impedance coil winding of the trigger coil and the stationary coil winding of the trigger coil lying in a plane orthogonal to the stationary circular power coil winding;

an engine control module arranged at a distance from said claw generator, said engine control module containing a processor and associated memory for establishment of appropriate ignition timing dependent on a trigger coil signal and mapped ignition timing in said memory, wherein the trigger coil signal from the claw generator is used for determining the rotational position for starting and ending the ignition timing;

an ignition coil module electrically connectible to an ignition plug of the combustion engine;

an electric supply system with a current conductor attached in one feeding end at the stationary circular power coil winding, said current conductor connected to and supplying energy to an ignition timing module and the ignition coil module.

2. The magneto ignition system according to claim 1, wherein the number of legs in each claw half is at least 4.

3. The magneto ignition system according to claim 2, wherein the number magnet poles is at least 8.

4. The magneto ignition system according to claim 1, wherein an ignition coil module is of the coil-on plug type with a housing connectible to an ignition plug of the combustion engine.

5. The magneto ignition system according to claim 1, further comprising a vibration sensitive knock sensor arranged permanently to the stationary circular power coil winding.

6. The magneto ignition system according to claim 5, further comprising a signal transmission architecture with a first vibration signal (Knock Signal) wire transmitting a vibration signal from the vibration sensitive knock sensor (23) to the engine control module (ECM).

7. The magneto ignition system according to claim 1, further comprising an ionization detection module electrically connected to the ignition coil, detecting the ionization current through the spark plug gap via the ignition coil.

8. The magneto ignition system according to claim 7, further comprising a signal transmission architecture with a second ionization signal wire (Ion Current) transmitting a signal representative for the ionization current from the ionization detection module (IDM) to the engine control module (ECM).

9. The magneto ignition system according to claim 7, wherein the ionization detection module (IDM) is integrated in the ignition coil module.

10. The magneto ignition system according to claim 6, further comprising a fueling system connected to the engine control module via a control conductor wire and said fueling system connected to the current conductor for supplying electrical energy to the fueling system from the claw generator.

11. The magneto ignition system according to claim 6, wherein the fueling system includes at least one electrically controlled fuel injector.

\* \* \* \* \*